Nov. 18, 1941.  F. B. HUNTER  2,263,462
BACKFIRE DOOR
Filed Oct. 10, 1939

INVENTOR
FRANK B. HUNTER
BY
ATTORNEY

Patented Nov. 18, 1941

2,263,462

UNITED STATES PATENT OFFICE 2,263,462

BACKFIRE DOOR

Frank B. Hunter, Wyckoff, N. J., assignor to Wright Aeronautical Corporation, a corporation of New York Application October 10, 1939, Serial No. 298,742

1 Claim. (Cl. 251—119)

This invention relates to backfire relief mechanisms for internal combustion engines, and has for a particular object the provision of a backfire door adapted to remain closed during normal engine operation, but which is subject to automatic opening if the pressure rises within the intake system due to backfire.

A further object of the invention is to provide a self-sealing backfire door composed of rubber or like substance, so arranged that the rubber compound acts both as the valve sealing means and as the resilient means for holding the valve closed.

A further object is to provide a backfire door which is free of complex mechanisms, which is readily produced and which may be applied to existing types of engines.

Further objects will be apparent from a reading of the annexed specification and claim, together with an examination of the accompanying drawing, in which:

Figure 1:
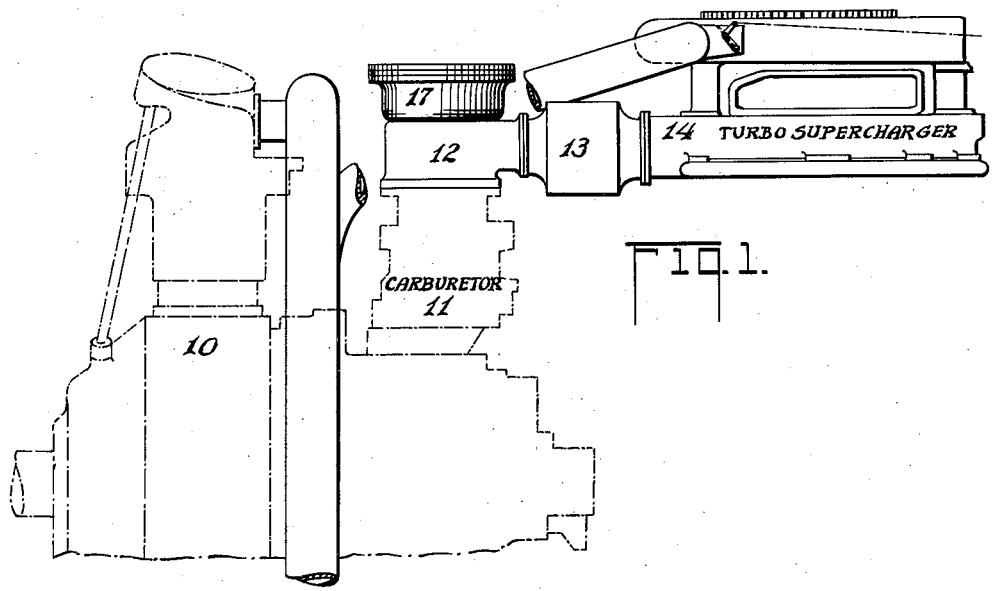
Fig. 1 is a diagrammatic representation of a supercharged aircraft engine incorporating the backfire door of the invention.
Figure 2:
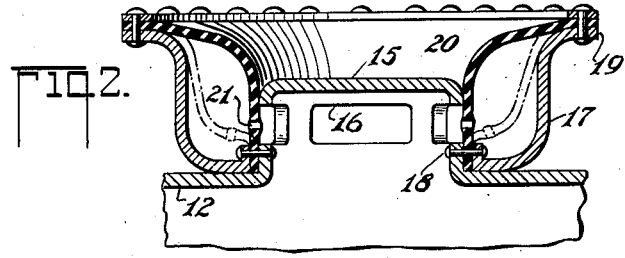
Fig. 2 is an enlarged section through the backfire door and a part of the intake system.

In Fig. 1 is shown an engine 10 to which is secured a carburetor 11 which is fed with air through an intake conduit 12 from an intercooler 13 and a supercharger 14, the latter being shown as an exhaust driven turbo supercharger of known type. Referring to Fig. 2, the conduit 12 is provided with a domed portion 15, having a plurality of openings 16 in the sides thereof, said sides being substantially cylindrical. To the lower part of the dome, an annular cup element 17 is secured as by rivets 18, the upper end of the cup being outwardly flanged as at 19. To the bottom of the dome 15, and to the flange 19, an annular rubber membrane 20 is secured, said membrane having a normal position, as shown in solid lines, wherein the lower skirt thereof covers and seals the openings 16, while the membrane 20 forms with the cup 17 an annular hollow which has restricted communication with the interior of the conduit 12 through small openings 21 in the skirt of the membrane. It will be seen that the resilience of the membrane 20 will normally hold it in firm contact with the walls of the dome 15, and due to the elastic nature of the rubber, an effective seal of the openings 16 is afforded without need of careful machining of the walls of the dome 15 as would be necessary if said walls comprised a valve seat in contact with a metallic valve element.

As indicated, the rubber membrane 20 may have any desired degree of elasticity, and due to the vent holes 21 pressure in the annular space between the membrane 20 and the cup 17 will be balanced in normal operation with the pressure existing within the conduit 12, whereby the spring effect of the membrane 20 enclosing the openings 16 will be substantially constant under all operating conditions. However, if a sudden pressure surge exists within the conduit 12, the membrane 20 will be blown away from the openings 16 permitting the gas within the conduit 12 to escape and relieve the excess pressure, the position of the membrane for opening of the openings 16 being shown in dotted lines.

Figure 3:
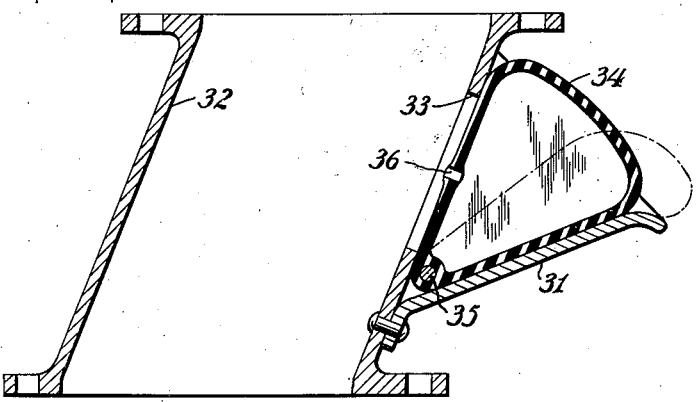
Fig. 3 is a section through an alternative embodiment.

In Fig. 3, I show an alternative arrangement in which a funnel-shaped support member 31 is secured to a conduit element 32 having an opening 33 over which a portion of the element 31 lies. Between the wall of the conduit 32 and the inside surface of the element 31 a wedge-shaped hollow rubber valve 34 is disposed, this valve being secured within the funnel element by a through bolt 35. The inner wall of the rubber element 34 ordinarily covers the opening 33. Upon the existence of backfire pressures in the conduit 32, the rubber element 34 will be blown away from the opening 33 to the position shown in dotted lines. The inner wall of the rubber element 34 is likewise provided with a restricted vent 36 to allow of pressure balance between the conduit and the interior of the element 34 during uniform running conditions, but this vent, as in the showing of Fig. 2, is of such small diameter as to prevent rapid pressure balance between the conduit and the rubber element, so as not to inhibit opening of the backfire door when the pressure rise within the conduit is sudden. As in the case of Fig. 2, the element 34 in Fig. 3 will seat fully upon a relatively smooth surface of the conduit and incorporates within itself the elastic properties, in any desired degree, necessary to sealing the backfire opening during normal operation.

While I have described my invention in detail in its present preferred embodiment, it will be obvious to those skilled in the art, after understanding my invention, that various changes and modifications may be made therein without departing from the spirit or scope thereof. I aim in the appended claim to cover all such modifications and changes.

I claim as my invention:

In a backfire relief apparatus for an engine intake conduit through which a compressible fluid passes, a domed protuberance having lateral openings, extending from the conduit wall, a support member surrounding the protuberance and spaced therefrom, one end of the member being sealed against the base of the protuberance, an elastic membrane of rubber or the like embracing the protuberance and secured at its inner edge to the base of the protuberance and at its outer edge to the outer edge of said support to define with the support a hollow cavity, said membrane being so arranged as to cover and seal the lateral openings of said protuberance when the conduit fluid pressure remains low and uniform and to uncover the openings under the influence of sudden increases in conduit fluid pressure, and a restricted vent providing communication between said cavity and the interior of said protuberance while the membrane covers said openings whereby the average pressure in the cavity and in the conduit is equalized slowly.

FRANK B. HUNTER.